March 14, 1961     F. G. HODELL     2,974,558

BLIND FASTENER PROVIDED WITH MANDREL NUT LOCKING MEANS

Filed June 11, 1957

INVENTOR.
FREDERICK G. HODELL
BY Hudson, Boughton,
Williams, David & Hoffmann
ATTORNEYS

2,974,558

BLIND FASTENER PROVIDED WITH MANDREL NUT LOCKING MEANS

Frederick G. Hodell, Gates Mills, Ohio, assignor to The National Screw & Manufacturing Company, Cleveland, Ohio, a corporation of Ohio Filed June 11, 1957, Ser. No. 665,039

2 Claims. (Cl. 85—40)

The present invention relates to fasteners and, more particularly, to so-called "blind" bolts.

The principal object of the invention is the provision of a novel and improved blind bolt especially designed for use in airplanes and like articles, and which bolt will have maximum performance characteristics, such as high tensile and shear strengths and is so constructed that it can be economically manufactured and used to secure parts together, the overall thickness of which may vary within rather wide limitations.

Another object of the invention is the provision of a novel and improved blind bolt incorporating a locking feature which will prevent loosening of the bolt as a result of vibration, etc.

The invention resides in certain constructions and arrangements of parts and further objects and advantages will be hereinafter referred to or will be apparent from the following description of the preferred embodiment of the invention described with reference to the accompanying drawings forming a part of this specification, in which similar reference characters designate corresponding parts, and in which.

Figure 1:
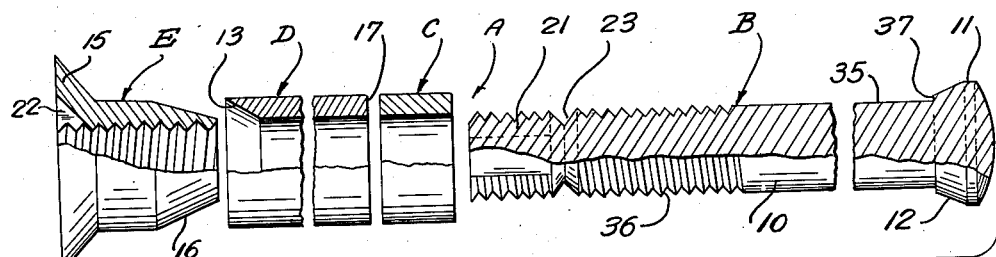
Fig. 1 is an expanded view of a bolt embodying the present invention, with parts broken away and in axial section to show the construction.
Figure 2:
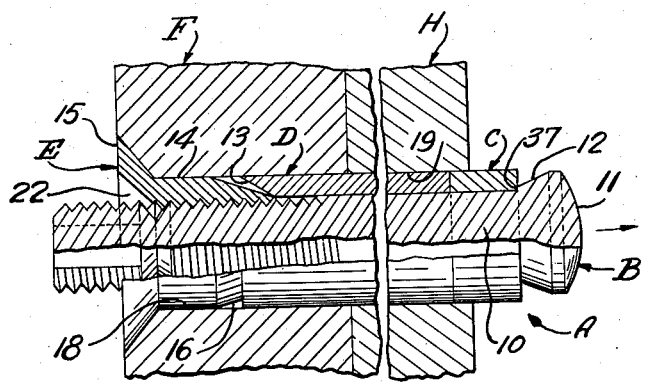
Fig. 2 is an axial, sectional view, with portions in elevation, of the assembled bolt in position for driving in the two members to be secured together thereby.

Referring to the drawings, the reference character A designates generally a blind bolt embodying the present invention and consisting of four parts: an internal or blind member, hereinafter referred to as the screw B, comprising a shank 10 having a head 11 at one end provided with a tapered or frusto-conical bearing face 12; a blind head member comprising a cylindrical, tubular sleeve or collar C; a spacer member comprising a cylindrical, tubular collar or sleeve D having a tapered or frusto-conical counterbore 13 in one end and a bearing surface 17 at its other end; an external or nonblind member, herein referred to as the nut E comprising a cylindrical shank or body portion 14 having countersunk-type head 15 at one end and a frusto-conical tip 16 at the other end. In use, the collar C, sleeve D, and non-blind member or nut E are assembled on the shank 10 of the blind member or screw B with the frusto-conical end of the nut E facing in the direction of the head 11 of the screw, the collar C adjacent to the head 11, and the sleeve D interposed on the shank 10 between the collar C and the frusto-conical end 16 of the nut E with the frusto-conical recess in the collar C adjacent to the frusto-conical end of the nut, as shown in Fig. 2. The assembled bolt is inserted with the screw head 11 leading into aligned holes in members to be secured together thereby; for example, the holes 18, 19 in the plate-like members F, H.

After the bolt A is assembled with the members to be secured together thereby, the parts of the bolt are drawn together, or, in other words, the bolt is contracted by relative rotation between the screw B and the nut E to draw and expand the right hand end of the collar C over the adjacent tapered or frusto-conical bearing face 12 of the head 11 of the screw B and to draw the frusto-conical counterbore 13 in the sleeve D over the tapered end 16 of the nut E to compress the feather end of the nut E into tight locking engagement with the threads of the screw B. When the bolt A is driven to a predetermined tension, the plate-like members F, H are securely fixed together or clamped between the head 15 of the nut E which engages the side of the plate-like member F adjacent thereto, and the expanded end or portion of the collar C which engages the side of the plate-like member H adjacent thereto.

The maximum diameters of the head 11 of the screw B, the collar C of the sleeve D, and the shank or body portion 14 of the nut E are all substantially equal, and the aligned holes, i.e., the holes 18, 19 in the plate-like members F, H to be secured together thereby, are so formed as by drilling, etc., that the aforementioned parts of the bolt can be readily inserted therein or therethrough, as the case may be. Either or both the screw B and the nut E can be rotated to contract the bolt and expand the collar C over the frusto-conical face 12 of the head 11 and move it into clamping engagement with the adjacent side of the adjoining plate-like member H while the head 15 of the nut E is drawn into clamping engagement with the adjoining side of the plate-like member F. For this purpose, both the screw B and the nut E are provided with driving connections or means on the exposed side of the plate F, which connections are adapted to be engaged by complementary connections on a suitable driving tool. As shown, that portion of the shank 10 of the screw B which normally projects beyond the nut E when the bolt is driven, is flattened, as at 21, on two opposite sides and is adapted to be engaged or received in a suitable, complementary aperture in the driving tool. The head 15 of the nut E is provided with slots 22 adapted to be engaged by a suitable tool, and which slots may be employed as may the flattened end of the shank 10 of the screw B, either to hold the respective member of which it is a part stationary or to rotate it.

The portion of the shank 10 of the screw B which normally projects beyond the nut E when the bolt is driven is preferably weakened adjacent to the inner ends of the flattened sides 21 as by the provision of a groove 23 which leaves a notched section of predetermined area and, when the bolt is used, the screw B is preferably rotated until the flattened end portion breaks away from the shank 10 at the notched section. This assures tightening or driving of the bolt to a predetermined stress or load. The head 15 of the nut E as shown is of the countersunk type, and the hole 17 in the member F is countersunk to accommodate the head, the construction being such that in use the head 15 of the nut E is flush with the exterior of the outer plate-like member F. This feature, however, is not essential to the invention, but is preferred in many applications, such as where the bolt is employed on the exterior of an airplane, as it provides a smooth surface. Obviously, other types of heads and driving or holding means, of which there are many available, may be employed.

As the parts of the bolt A are drawn together into their final operative or driven positions, the pressure of the collar D upon the frusto-conical end 16 of the nut E tends to and does force the end of the nut E, and particularly the feather end portion thereof, into the threads of the screw B to effect a fluid seal therebetween and into tight clamping engagement with the shank 10 of the screw B to effect a secure nut lock between the screw B and the nut E. In the embodiment shown the end 16 of the nut E is of slightly less taper than that of the counterbore 13 in the sleeve D. This assists in forcing the end of the nut E inwardly and into tight clamping engagement with the screw B. The degree of taper employed on either the sleeve D or the nut E is not particularly critical so long as the end of the nut E is sufficiently flexible to be forced into engagements with the shank of the screw. In the embodiment shown, the taper on the end of the nut is approximately 15°, and that of the sleeve approximately 20°, but tapers up to 60° and more could be used, depending upon the hardness of the material, etc.

Tests have indicated that during installation of the bolt A, the part of the shank 10 immediately adjacent to the head 11, which part is subjected to a complex combination of shear, torsion and tensile stresses and loads, is the part of the shank most likely to fail. Accordingly, the present invention provides maximum effective shank diameter at this location consistent with the requirements of the other parts of the bolt. To this end, a section 35 of the shank of the screw adjacent to the head of the screw is preferably unthreaded. In the embodiment shown, the thread 36 of the screw B extends along the shank 10 of the screw B to a point only slightly beyond the end of the nut E when the fastener is driven and the sleeve D is unthreaded. Alternatively, the thread may extend to or adjacent to the head of the screw B in this event, however maximum shear strength would not be attained. It is also desirable to form a small shoulder 37 where the head 11 joins the shank 10 of the screw B.

In practice, the bolts A are made in predetermined sizes and the various parts are designed and proportioned, etc., to produce maximum strength and minimum weight for a given size. The shanks of the screws of the bolts are preferably made to standard screw sizes, for example, 4–48, 6–40, 8–36, 10–32, 12–28, etc., and a given shank construction predetermines, to at least a large extent, the construction of the other parts, etc.

Figure 3:
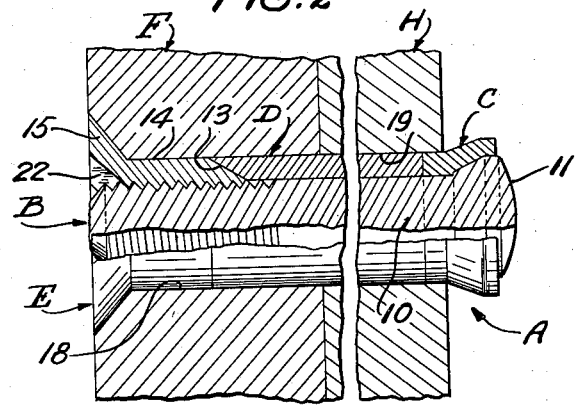
Fig. 3 is a view similar to Fig. 2 but showing the bolt subsequent to being driven or set and in operation fixedly securing the members together.

The bolts are also made in different lengths, each designed to fasten two or more members together having an overall predetermined thickness, and the lengths of the respective parts while being made as short as possible consistent with other requirements in an effort to save weight, are preferably so proportioned that when the bolt is in use or driven, the nonblind end of the collar is slightly within the aperture in the member adjacent thereto and the head of the screw is about flush with the other end of the collar. The thickness of the members secured together will vary since all parts are manufactured to plus or minus tolerances, but variations in total or overall thickness of the parts secured together within limits will not interfere with the operation of the bolt. The length of the collar or blind head member and the nut or nonblind member are preferably the same for all fasteners having the same shank diameters, the different grip length being provided by varying the length of the screw and the sleeve intermediate the nut and the blind head collar. The length of the sleeve is preferably such, as previously suggested, that when the bolt is in use, the front end of the collar is slightly within the rear or blind end of the hole in the parts fastened together—for example, approximately .030" to .125". When the fastener is driven the end of the blind head member adjacent to the head of the screw is spun and expanded over the tapered face of the head of the screw and assumes a frustoconical shape, as illustrated in Fig. 3.

When the bolts intended for airplane or like use, where maximum strength and minimum weight is desired, the screw B and, more particularly, the shank 10 is preferably made of material having a uniform homogeneous structure throughout and a tensile strength of not less than about 180,000 pounds per square inch. For example, the screw B may be made of a molybdenum-chromium-nickel, low alloy steel, such as AN–S–9, 13, 14, 15 heat treated to produce a uniform composition having high tensile strength, etc. Such treatment may consist of heating the screw to a temperature of about 1550° to 1600° F. for a period of about thirty-five minutes in a consistent atmosphere comprising $H_2$ about 40%, Co about 20% $CH_4$ 1% or less, $CO_2$, less than 0.5%, $O_2$ less than 0.5%, and the balance $N_2$, said atmosphere having a dew point of from about 42% to 47%. An atmosphere of the character referred to can be produced by an endothermic generator. When alloys of the character mentioned are so treated, they have a surface carbon of about 0.35% to 0.45%. The heated screws are quenched in oil without removal from the atmosphere and given a double draw of about 700° to 750° F. Each draw should be held at heat for about two hours; in other words, subsequent to quenching the screws should be heated to about 700° to 750° F. for two hours, gradually cooled to room temperature, again heated to about 700° to 750° F. and gradually cooled again to room temperature.

The sleeves D and the nuts E for use with screws of the character mentioned are preferably made of material similar to that of the screws B. If desired, the sleeve D may be made of harder material than that employed in the nut E. The collar C, which must be ductile as well as of high tensile and shear strengths, is preferably made of a corrosion-resistant steel extremely sensitive to cold-working, that is, a steel capable of having its hardness and strength improved by cold-working, for example, AN–QQ–771. Suitable steels known as gamma iron or austenitic are non-magnetic and have a face center cubical crystal structure which when cold-worked, as is the collar C in driving the bolt, at least partially change to alpha iron or ferritic having a body center cubical structure and the cold-worked portion becomes magnetic.

The degree or angle of taper of the tapered or frustoconical portion 12 of the head 11 is reasonably critical as the longitudinal and radial forces produced thereby against the collar must be proportioned and the collar must be expanded sufficiently to produce adequate cold working to obtain the desired strength characteristics. The angle of the bevel is preferably not less than about 20°. The height of the head 11 of the screw B is preferably about one-half to two-thirds of the shank diameter and the diameter of the head is about 1.5 times the shank diameter.

From the foregoing description of the preferred embodiment of the invention, it will be apparent that the objects heretofore enumerated and others have been accomplished and that there has been provided a novel and improved so-called blind bolt. While a preferred embodiment of the invention has been shown and described in considerable detail, the invention is not limited to the construction shown. Obviously, other known blind head members and/or ways of forming blind heads may be employed, for example, the bearing surface of the head of the screw could be made normal to the axis of the screw or slightly undercut and the adjacent bearing surface on the sleeve tapered so as to flare the front end of the collar or blind head member when the fastener is driven. In this event the length of the sleeve intermediate the nut and the blind head sleeve must be such as to project through the internal member with which the fastener is employed so that the member will not interfere with the flaring or expanding of the end of the blind head collar adjacent thereto. As a further alternative construction, the sleeve and collar could be made in one piece. With this construction, however, certain advantages of the preferred construction would be lost. Accordingly, it is the intention to cover hereby all adaptations, modifications and uses of the fastener shown and described which come within the practice of those skilled in the art to which the invention relates and within the scope of the appended claims.

Having thus described my invention, what I claim is:

1. In a blind fastener for securing together a plurality of contiguous structures having a circular aperture therethrough: a nut comprising a tubular-like portion, a frusto-conically shaped portion at one end of said tubular-like portion decreasing in diameter in the direction away from said tubular-like portion, a head at the other end of said tubular-like portion, said head of said nut having a driving connection, said tubular-like portion of said nut having a length such that said frusto-conically shaped portion will not project through said structures when said nut is assembled with said structure with the side of said head adjacent to said tubular-like portion in engagement with said structures at one of their exposed sides and said tubular-like portion positioned in said aperture; a headed screw threaded into said nut from said frusto-conically shaped portion and having a driving connection at its end opposite to its head, said head of said screw having a diameter substantially equal to the minimum outside diameter of said tubular-like portion of said nut and adapted to be located at one exposed side of said structures when said nut and screw are assembled with said structures with said side of said head of said nut adjacent to said tubular-like portion in engagement with said structures at their other exposed side and said tubular-like portion located in said aperture; sleeve means on said screw intermediate said frusto-conically shaped portion of said nut and said head of said screw, said sleeve means having an outside diameter substantially equal to the minimum outside diameter of said tubular-like portion of said nut, a frusto-conical recess in the end thereof adjacent to said nut coacting with said frusto-conically shaped portion of said nut when said fastener is driven, and a length such that a portion thereof projects from said structures at one of their exposed sides when said nut, screw and sleeve means are assembled with said structures with said side of said head of said nut adjacent to said tubular-like portion in engagement with said structures at the other of their exposed sides; and means for outwardly deforming said portion of said sleeve means at one exposed side of said structures when said nut, screw and sleeve means are assembled with said structures with said face of said head of said nut adjacent to said tubular-like body in engagement with said structures at the other of their exposed sides and said tubular-like portion and said frusto-conically shaped portion positioned in said aperture into a blind head at said one exposed side of said structures upon relative rotation between said nut and said screw.

2. In combination a plurality of contiguous structures having a circular aperture therethrough, a nut comprising a tubular-like portion having a frusto-conically shaped portion at one end decreasing in diameter in the direction away from said tubular-like portion and a head at its other end provided with a driving connection, said head having a side adjacent to said tubular-like portion in engagement with said structures at one of their exposed sides and said tubular-like portion and said frusto-conically shaped portion being in said aperture and not projecting through said structures at the other of their exposed sides, a headed screw threaded into said nut from said frusto-conically shaped portion thereof, said head of said screw having a diameter substantially equal to the minimum outside diameter of said tubular-like portion of said nut and being at said other of the exposed sides of said structures, sleeve means on said screw having a frusto-conical recess abutting said frusto-conically shaped portion of said nut and projecting from said structures at said other of their exposed sides, the portion of said sleeve means within said structures having an outside diameter substantially equal to the minimum outside diameter of said tubular-like portion of said nut and a portion of said sleeve means at said other exposed side of said structures being expanded into a blind head by relative rotation between said nut and said screw.

References Cited in the file of this patent

UNITED STATES PATENTS

| | | |
|---|---|---|
| Re. 23,640 | Smith | Mar. 31, 1953 |
| 1,551,381 | Foss | Aug. 25, 1925 |
| 1,969,142 | McIntyre | Aug. 7, 1934 |
| 2,282,711 | Eklund | May 12, 1942 |
| 2,406,157 | Nelson | Aug. 20, 1946 |
| 2,765,699 | LaTorre | Oct. 9, 1956 |

FOREIGN PATENTS

| | | |
|---|---|---|
| 91,195 | Switzerland | Oct. 17, 1921 |
| 600,962 | Great Britain | Apr. 23, 1948 |